United States Patent
Sundharraj et al.

(10) Patent No.: US 7,320,069 B1
(45) Date of Patent: Jan. 15, 2008

(54) SELECTIVE ENCRYPTION OF MEDIA DATA

(75) Inventors: Gobikrishnan Sundharraj, San Jose, CA (US); Jamshid Madhavi, San Jose, CA (US)

(73) Assignee: Novell, Inc., Provo, UT (US)

( * ) Notice: Subject to any disclaimer, the term of this patent is extended or adjusted under 35 U.S.C. 154(b) by 871 days.

(21) Appl. No.: 10/367,477

(22) Filed: Feb. 14, 2003

(51) Int. Cl.
| | |
|---|---|
| H04L 9/00 | (2006.01) |
| G06F 11/00 | (2006.01) |
| G06F 12/14 | (2006.01) |
| G06F 12/16 | (2006.01) |
| G06F 15/18 | (2006.01) |
| H04N 7/167 | (2006.01) |

(52) U.S. Cl. .................. 713/153; 726/26; 380/200; 380/201; 380/210; 725/31

(58) Field of Classification Search .............. 726/26; 713/153; 380/200, 201, 210; 725/31
See application file for complete search history.

(56) References Cited

U.S. PATENT DOCUMENTS

| | | | |
|---|---|---|---|
| 4,172,213 A | 10/1979 | Barnes et al. | 380/29 |
| 4,535,355 A | 8/1985 | Arn et al. | 380/12 |
| 5,640,456 A * | 6/1997 | Adams et al. | 713/153 |
| 5,805,700 A * | 9/1998 | Nardone et al. | 380/217 |
| 6,286,103 B1 | 9/2001 | Maillard et al. | 713/200 |
| 6,304,973 B1 * | 10/2001 | Williams | 726/3 |
| 6,415,031 B1 * | 7/2002 | Colligan et al. | 380/200 |
| 6,449,719 B1 | 9/2002 | Baker | 713/168 |
| 6,931,597 B1 * | 8/2005 | Prakash | 715/741 |
| 6,963,972 B1 * | 11/2005 | Chang et al. | 713/153 |
| 7,039,938 B2 * | 5/2006 | Candelore | 725/87 |
| 2001/0018741 A1 * | 8/2001 | Hogan | 713/189 |
| 2002/0025045 A1 * | 2/2002 | Raike | 380/280 |
| 2002/0133699 A1 * | 9/2002 | Pueschel | 713/153 |
| 2003/0012376 A1 * | 1/2003 | Wee et al. | 380/200 |
| 2003/0021412 A1 * | 1/2003 | Candelore et al. | 380/217 |
| 2003/0159139 A1 * | 8/2003 | Candelore et al. | 725/25 |
| 2004/0028227 A1 * | 2/2004 | Yu | 380/201 |

OTHER PUBLICATIONS

Schulzrinne, H. et al. "Real Time Streaming Protocol (RTSP)", Apr. 1998, RFC 2326.*
Sourceforge. "MPEG Headers Quick Reference", <http://dvd.sourceforge.net/dvdinfo/mpeghdrs.html>.*
Spanos, George et al. "Performance Study of a Selective Encrypfion Scheme for the Security of Networked, Real-Time Video", 1995 IEEE.*
Tosun, Ali Saman et al. "Efficient Multi-layer Coding and Encryption of MPEG Video Streams", 2000 IEEE.*
Aly, Salah. "A Light-Weight Encrypting For Real Time Video Transmission", 2004.*

(Continued)

Primary Examiner—Kambiz Zand
Assistant Examiner—Michael J Simitoski
(74) Attorney, Agent, or Firm—Schwegman, Lundberg, & Woessner, P.A.

(57) ABSTRACT

Methods, systems, and data structures are provided selectively encrypting portions of media data that are streamed over a network. Media data is identified and a portion of the data is selectively encrypted. The media data is then streamed over a network to one or more recipients for consumption. The intended recipients cannot consume the media data until the encrypted portion is properly decrypted.

4 Claims, 3 Drawing Sheets

OTHER PUBLICATIONS

Gralla, Preston. How The Internet Works, 1997 Macmillan Computer Publishing USA.*

Meyer, Jurgen et al. "Security mechanisms for Multimedia-Data with the Example MPEG-I-Video", 1995.*

Podesser, Martina et al. "Selective Bitplane Encryption For Secure Transmission of Image Data in Mobile Environments".*

Tosun, Ali Saman et al. "Lightweight Security Mechanisms for Wireless Video Transmission", 2001 IEEE.*

Podesser, Martina et al. "Selective Bitplane Encryption for Secure Transmission of Image Data in Mobile Environments", (2002).*

Schulzrinne, H. et al. "Real Time Streaming Protocol (RTSP)", Apr. 1998, RFC 2326.*

Sourceforge. "MPEG Headers Quick Reference", <http://dvd.sourceforge.net/dvdinfo/mpeghdrs.html>. (2000).*

Tosun, Ali Saman et al. "Efficient Multi-layer Coding and Encryption of MPEG Video Streams", 2000 IEEE.*

* cited by examiner

SELECTIVE ENCRYPTION OF MEDIA DATA

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright © 2003, Novell, Inc., All Rights Reserved.

FIELD OF THE INVENTION

The present invention relates to media data, and in particular to techniques for selectively encrypting media data streamed over a network.

BACKGROUND OF THE INVENTION

Media data consumes large amounts of network bandwidth because of its voluminous nature. This presents problems for content providers that desire to distribute the media data in a secure fashion in order to prevent unauthorized consumption and uses of the media content over a network. Conventionally, content providers may elect to encrypt all the data associated with media content before the media content is streamed over a network. However, this uses considerable processor and memory resources of the content provider as well as resources associated with any intended recipients of the media data, since each recipient must decrypt the media data before it can be consumed. Accordingly, in many instances, content providers have elected not to encrypt their media data at all, thus foregoing security for improved processing and memory utilization.

In general, in order to improve media content delivery, media data is broken into smaller packets or frames that are then streamed over a network to an intended recipient. Software applications associated with the recipient's computing device will then assemble or buffer the packets to some predetermined level and immediately begin to play the media data on the recipient's computing device. In cases where the content provider has encrypted the media data, each packet or frame will be encrypted and each packet or frame must therefore be decrypted by software applications on the recipient's computing device. This unduly taxes the recipient's computing device and result in an unnecessary long initial start-up latency before the media data is played.

In a similar manner, the content provider's media servers or computing devices are heavily taxed when encryption is desired, since all the media data destined for each recipient must be encrypted before it is streamed to a recipient. This can consume large amounts of processing and memory resources associated with the content provider's media servers or computing devices.

Furthermore, in cases where the media data is video that is being streamed over the Internet, content providers attempt to achieve some efficiency by using a technique that uses key frames and difference frames. Key frames include a complete representation of a video frame, whereas difference frames include information that has changed relative to a previous or future frame in the video stream. The previous or future frame may or may not be a key frame. Yet, in these circumstances the content provider still elects to either encrypt both key frames and difference frames for purposes of security, or alternatively the content provider encrypts none of the frames. As a result, content providers and intended recipients still experience unnecessary utilization of processor, memory, and/or network bandwidth resources.

As is now apparent to one of ordinary skill in the art, there exists a need for improved techniques that can securely stream media data over a network in a more efficient manner. This need is particularly desirable for content providers that stream large media files over a network. Furthermore, the techniques should be capable of securely delivering media content to intended recipients without requiring the entire media file to be encrypted. Likewise, an intended recipient's computing device should not be unduly taxed by having to decrypt an entire media content data stream before the intended recipient can securely consume the media content.

SUMMARY OF THE INVENTION

In various embodiments of the present invention, techniques for selectively encrypting a portion of media data are presented. The media data includes only a small portion of encrypted data. However, the media data is not useful to an intended recipient until the small-encrypted portion of data is decrypted. Thus, media data can be securely steamed and distributed across a network with minimal encryption. This will improve the processing throughput of the media content distributor and the processing throughput of any intended recipients, which consume the media data.

More specifically and in one embodiment of the present invention, a method to selectively encrypt media data is described. Initially, media data that is to be streamed over a network is received. Next, a portion of the media data is selectively encrypted. Finally the media data including the encrypted portion is streamed over the network.

In another embodiment of the present invention, another method to selectively encrypt media data is discussed. A portion of media data is selectively encrypted. Moreover, the media data along with the encrypted portion are streamed to one or more recipients.

In still another embodiment of the present invention, a system to selectively encrypt media data is taught. The system includes media data, an encryption application, and a streaming application. The encryption application selectively encrypts a portion of the media data. The streaming application streams the media data with its encrypted portion over a network.

In yet another embodiment of the present invention, media data that is partially encrypted and resides in a computer readable medium is provided. The media data includes an encrypted portion of data associated with the media data and an unencrypted portion of data associated with the media data. The encrypted portion of data requires decryption before the unencrypted portion can be consumed.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

Figure 1:
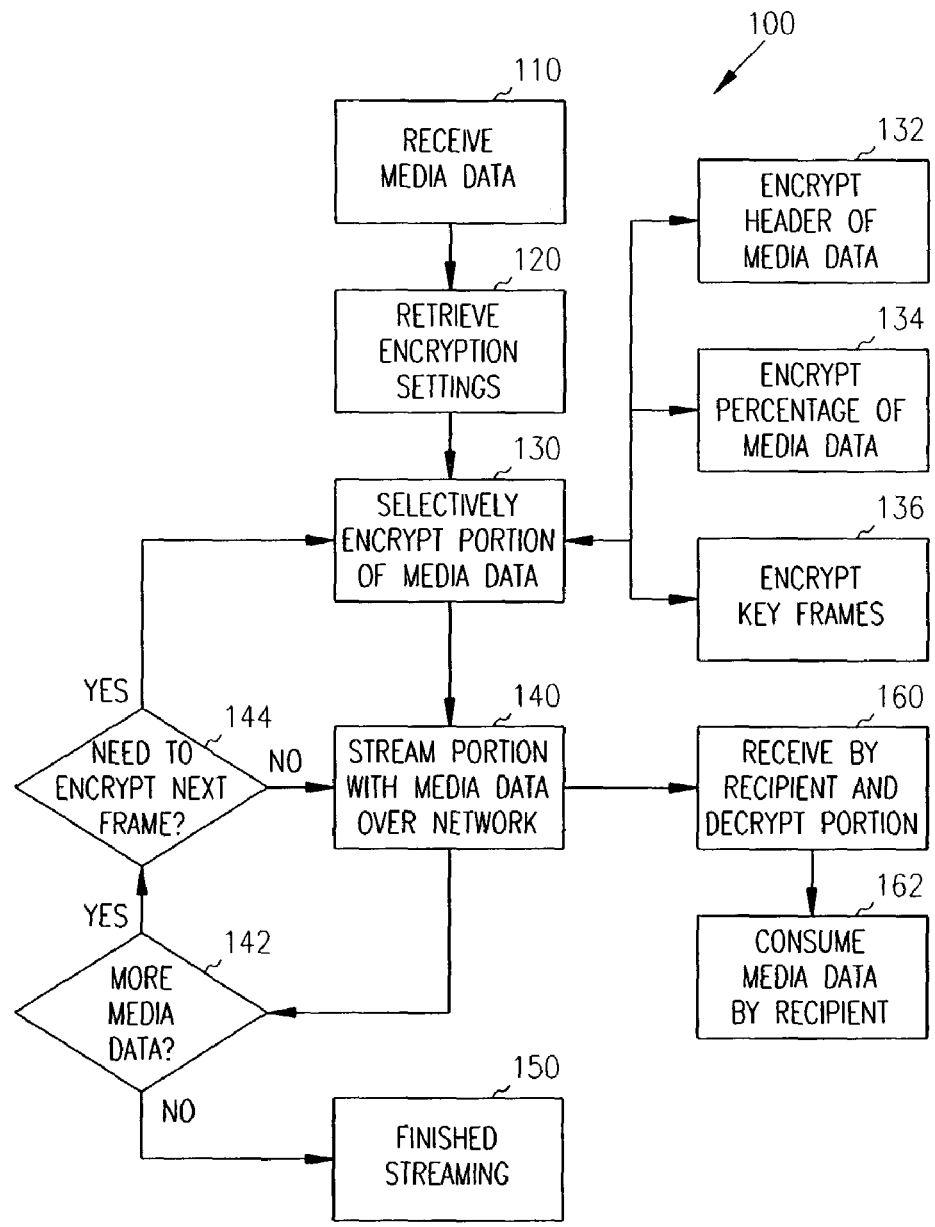
FIG. 1 is a flowchart representing a method for selectively encrypting media data, according to one embodiment of the present invention.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

In various embodiments of the present invention, the phrase "media data" is used. Media data includes, by way of example only, video, audio, image, graphical data, or combinations of video, audio, image, and graphical data. Moreover, a network includes wireless networks or hardwired networks that are direct (e.g., point-to-point, and the like) or indirect (e.g., Internet, and the like). A network can also be configured as a Wide Area Network (WAN), a Local Area Network (LAN), or a Metropolitan Area Network (MAN). Some networks that carry media data can be referred to as Content Delivery Networks (CDNs). CDNs can be designated as network paths and resources that are optimized for streaming media data from a content provider to one or more intended recipients. Various software applications exist for creating efficient CDNs, such as and by way of example only, Velocity CDN, distributed by Novell, Inc. of Provo, Utah.

A content provider is an entity or individual that is providing media data over a network. Thus, a content provider provides media data to recipients over a network. Both content providers and recipients use computing devices to send and receive media data. Various, software applications readily known and available to one of ordinary skill in the art process (e.g., send, buffer, receive, and play) the media data on the recipient and content provider's computing devices. By way of example only, a few media data software applications include Media Excelerator and Secure Excelerator, distributed by Novell, Inc. of Provo, Utah.

Additionally, the embodiments of the present invention include encryption technologies. The encryption technologies include standard encryption techniques and applications readily available to one of ordinary skill in the art, such as, but not limited to, Public Key Infrastructure techniques (e.g., public-private key pairs, digital certificates, digital signatures, and the like). Further, the encryption technologies include applications to both encrypt and decrypt data. Ad hoc or custom developed encryption techniques can also be implemented and used with the embodiments of the present invention.

Furthermore, in one embodiment, the present disclosure is implemented using Volera's Content Distribution Network (VCDN) product offerings, distributed by Novell, Inc., of Provo Utah. Moreover, various embodiments utilize Media Excelerator and Secure Excelerator, both distributed by Novell, Inc., of Provo, Utah. The media data of various embodiments of the present disclosure can be played or processed using any media player application, such as Windows Media Player, Real Player, Quicktime, and others. Additionally, the embodiments of the present invention are not intended to be limited to any particular network, or media software application, since it will be readily apparent to one of ordinary skill in the art upon reading the present disclosure that any existing media application can be used to implement the teachings presented herein. Therefore, any network or media application modified to achieve the teachings of the embodiments of the present disclosure are intended to fall within the scope of this invention.

FIG. 1 illustrates a flowchart representing one method 100 for selectively encrypting media data, according to one embodiment of the present invention. The method 100 is implemented in a computer accessible medium utilizing media streaming applications, media player applications, and encryption applications. Furthermore, method 100 is adapted to stream media data over a network to one or more intended recipients.

At 110, media data is received or retrieved. The media data can reside in any computer accessible medium or combinations of media. In some embodiments, the media data is streamed from its storage location to method 100 for processing. In other embodiments, the media data is piped to memory accessible to method 100 for processing. In still further embodiments, the media data's header information is initially acquired before the actual content of the media data is received, streamed, retrieved, and/or piped to method 100 for processing. Moreover, media data includes video, audio, image, and/or graphical data.

At 120, the encryption settings are retrieved. Encryption settings are configurable options associated with the encryption that is desired on the media data. These settings can be supplied to method 100 from a content provider interfacing with method 100 through any user interface applications (e.g., Graphical User Interface (GUI), Unix User Interface (UUI), Text User Interface (TUI), Disk Operating System (DOS) User Interface (DUI), and others). The options or settings can identify the encryption being used (e.g., Public Key Infrastructure (PKI) encryption, or custom/ad hoc encryption). Moreover, the options or settings identify a partial encryption technique that method 100 is to apply against the media data that is being partially encrypted.

Accordingly, at 130, a portion of the media data is encrypted based on the retrieved encryption settings or options. The portion of media data can include encryption of only the header information of the media data, at 132, encryption of a predefined percentage of the media data, or encryption of key frames, at 136.

The header information can include a packet header or a frame header associated with the media data. Typically, header information or frame information contains metadata about the media data as a whole or information about frames or packets included within the media data. By selectively encrypting header information, the media data is secured during streaming to an intended recipient, since the intended recipient cannot use the media data without the header information. Thus, only authorized or intended recipients are capable of using the media data when they have the necessary decryption keys, signatures, and/or certificates to decrypt the header information. In this way, the media data is secured with only minimal amount of encryption required. As one of ordinary skill in the art appreciates, this technique saves considerable processing and memory resources for both the content provider and the intended recipients, since only a portion of the media data is used to securely stream the media data and validate its consumption.

When only a percentage of the media data is encrypted, a variety of techniques can be used. For example, the data may be divided into chunks that are of a predefined size. Within each chunk, a selected number of bytes can be encrypted. Thus, a beginning portion can be encrypted and then various contiguous portions of the media data can remain unencrypted with some intertwined portions that are contiguously encrypted. Alternatively, only a beginning portion of the media data is encrypted with the remaining portions unencrypted. One of ordinary skill in the art appreciates that a variety of variations on this can be achieved, all of which are intended to fall within the scope of the present disclosure. Correspondingly, a configurable small portion of the media data is selectively encrypted, such that the media data can be securely streamed by a content provider and processed by only authorized recipients that have the appropriate decryption keys.

Alternatively, in some situations, such as when the media data is video, only the key frames associated with the media data can be encrypted. The remaining difference frames are not encrypted. Additionally, only a selected number or percentage of key frames can be encrypted. Accordingly, one of ordinary skill in the art appreciates that video can be selectively encrypted with the teachings of the present disclosure to ensure secure streaming and consumption of video.

At 140, once a portion (at least an initial portion that is to be streamed) of the media data is encrypted the portion and the beginning pieces of unencrypted media data are streamed to an intended recipient over a network. Next, since the media data is being dynamically streamed, a check is made at 142 to determine if all the media data has been streamed to the recipient. If the media data has not been fully streamed, then, at 144, another check is made to determine whether the next packet or frame of media data requires any further selective encryption. In some cases, the next packet or frame may not require any further encryption, such as when the frame is a difference frame associated with a key frame that was encrypted. Under these circumstances, no additional encryption is processed. However, under different circumstances, each packet or frame is partially encrypted and thus, at 130, the next media packet or frame to be streamed is processed with partial encryption.

Processing at 140 continues to iterate until all the media data has finished streaming at 150 over the network to the intended recipient. Concurrent to this iterative streaming process, the intended recipient's computing device and media applications are receiving, buffering, decrypting, and consuming (e.g., playing) the media data as it is being streamed to the recipient. However, before consumption can effectively proceed, at 160, the recipient needs to have the appropriate decryption keys that are necessary to decrypt the portion of the media data that is encrypted. Without these keys, the recipient may receive the media data but the data will be of no value, since it cannot be consumed without the proper decryption keys. A recipient processing the proper decryption keys will decrypt the encrypted portion of the media data and be capable of consuming the media data in its entirety at 162.

It has now been demonstrated to one of ordinary skill in the art, how selective encryption of media data can be used to more efficiently and securely stream media data over a network to an intended recipient. These techniques now allow a content provider to securely transmit its content, without sacrificing valuable processing and memory resources on the content provider's servers or computing devices. Additionally, now recipients can receive, validate, and consume media data more efficiently than what has been conventionally available. Furthermore, since the embodiments of the present invention only encrypt a portion of the media data, a recipient may experience a decrease in startup latency before the media data begins to play or is consumed within the recipient's computing environment.

Figure 2:
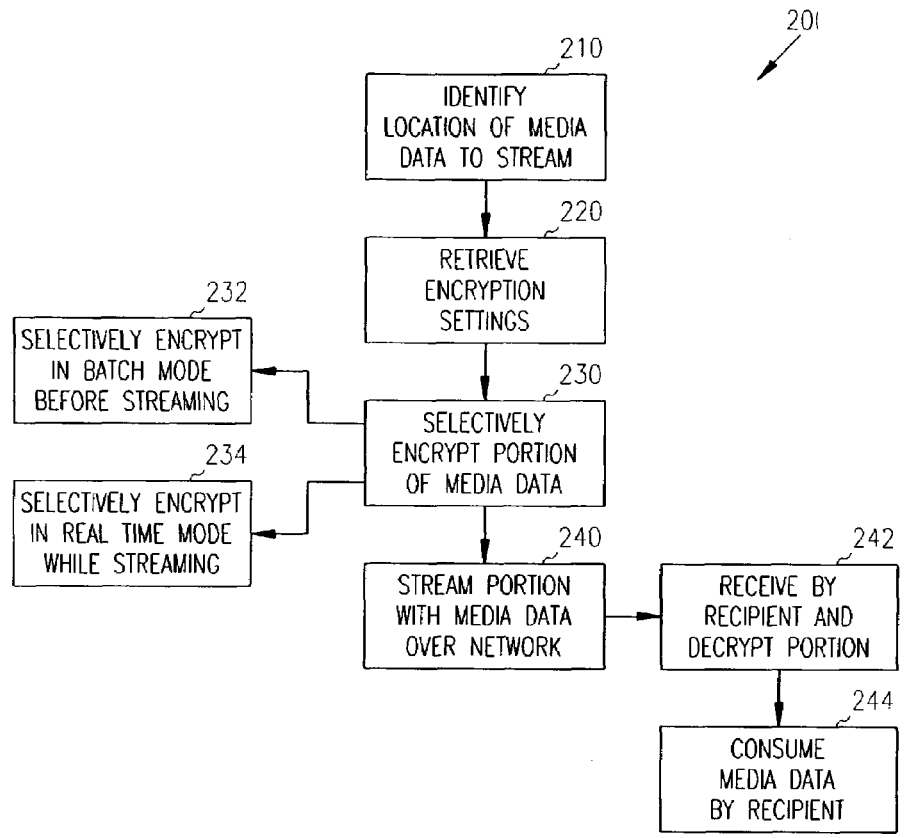
FIG. 2 is a flowchart representing another method for selectively encrypting media data, according to one embodiment of the present invention.

FIG. 2 illustrates a flowchart representing another method 200 for selectively encrypting media data, according to one embodiment of the present invention. The method 200 can be implemented in media streaming applications, media players, or standalone applications. Moreover, the method is implemented in a computer accessible medium or media. The media data can reside in any combination of physical storage or memory that is accessible to method 200.

Initially, a request is received to stream media data over a network to one or more intended and authorized recipients. The request identifies the media data to stream over the network. At 210, the location of the media data is identified, and at 220 encryption settings or options are retrieved in order to selectively encrypt a portion of the media data before and optionally during the streaming process.

The settings permit method 200 to identify which type of selective encryption is to occur with the media data. As was previously presented with the discussion of FIG. 1, the type of selective encryption can include encrypting a portion of the header, frame, or packet information. The type can also include encrypting a certain configurable percentage (e.g., 1% to 10%) of the media data or encrypting all or some of the key frames associated with media data that is video.

In some embodiments, at 232, the entire media data can be selectively encrypted in batch mode before the media data is streamed. This may be advantageous in situations where the media data is relatively small in size, or in situations where a particular recipient or set of recipients regularly access and use the same media data. In some embodiments, selective encryption can be the native storage format for the media data in its native location. This may be advantageous where private media data is being warehoused for particular recipients. In this way, the selective encryption is prefabricated for the particular recipients in a batch mode and then stored and immediately streamed over a network when requested by one or more of the particular recipients. Thus, various embodiments of the present invention can be further customized to achieve efficiencies within processor and memory resources of a content provider.

In still other embodiments, at 234, the media data is selectively encrypted in real time or dynamically as the media data is being received, processed, and streamed with method 234. This is advantageous where different encryption keys and/or encryption technologies are being used based on the intended recipients and/or where the media data is voluminous. Thus, how and when a content provider encrypts the media data are configurable aspects with embodiments of the present invention. Moreover, only a relatively small portion of the media data needs to be encrypted to ensure secure transmission and consumption of the media data.

At 240, the encrypted portion of the media data is streamed over a network to one or more intended recipients. In one embodiment, the media frames or packets are streamed over the network using a Real Time Streaming Protocol (RTSP). Of course, one of ordinary skill in the art readily appreciates that any existing, custom, and/or future developed protocol that permits media streaming can be used with the embodiments of the present invention.

At 242, a recipient's computing device and media applications begin receiving the encrypted portion and the remaining unencrypted portion from the network. This data is buffered until a predefined amount of data is received (this is based on the recipient's media application requirements). Once enough data is buffered, the recipient's media player consumes/plays the media data at 244. However, before the media data can be played, the recipient's media applications need to have the proper decryption key to decrypt the encrypted portion of the media data. In some embodiments, as the media data is buffered a check is made to determine if the recipient possess the proper decryption key and while buffering the encrypted portion is decrypted. In other embodiments, the decryption occurs after the data is buffered to a predefined amount but before the media player begins to play/consume the media data.

By selectively encrypting only a portion of the media data before streaming the media data over a network, a content provider can more efficiently and securely manage and distribute media data. Additionally, recipients can experience more timely consumption of secure media data being consumed, since only a portion of the media data needs to be authenticated. In contrast, conventional techniques have either elected to not secure media content streamed over a network or have unnecessarily encrypted all of a media data stream that is streamed over the network. One of ordinary skill in the art now appreciates that the embodiments of the present invention offer more efficient secure media delivery and consumption over a network.

Figure 3:
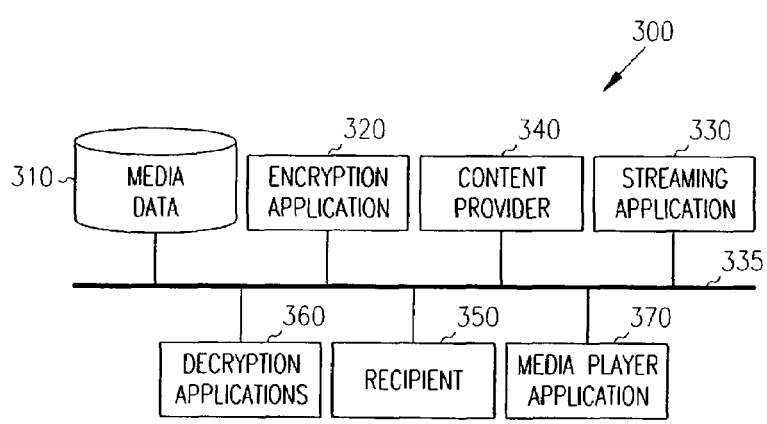
FIG. 3 is a diagram of a system to selectively encrypt media data, according to one embodiment of the present invention.

FIG. 3 illustrates a diagram of one system 300 to selectively encrypt media data, according to one embodiment of the present invention. The system 300 includes media data 310, an encryption application 320, and a streaming application 330. The system 300 is implemented in a computer accessible medium and is interfaced to a network 335. The network can be any type of network (e.g., LAN, MAN, WAN (e.g., Internet and others), point-to-point, and/or combinations of networks interfaced together. Moreover, the components of the system 300 can be networked together and therefore be remote from one another. For example, the media data 310 can reside on a storage server, while the encryption application 320 and/or streaming application 330 reside on a processing server.

The media data 310 can include video, audio, image, and/or graphical data. Moreover, the media data 310 can include frame, header, or packet metadata that identifies attributes of the media data 310 necessary to process and play the media data 310. The media data 310 can be located in multiple storage locations and logically assembled by one or more media applications. Furthermore, the media data 310 can be partially in physical storage and partially in memory (e.g., Random Access Memory (RAM)) when it is being processed by system 300.

The encryption application 320 can be any existing encryption application that is selectively provided portions of the media data 310 that is to be encrypted. Thus, existing encryption applications 320 can be used in system 300 where these applications selectively encrypt only portions of the media data 310. This can be achieved by placing a wrapper around existing encryption applications 320 such that only the desired portions of media data 310 that need to be encrypted are fed to the encryption application 320. Alternatively, the encryption application 320 can be custom developed with various embodiments of the present invention to selectively encrypt only identified or configured portions of the media data 310. Any custom developed encryption application 320 can still use existing encryption algorithms to perform standard encryption (e.g., PKI, and others). Thus, the encryption application 320 either directly or indirectly processes configuration settings associated with selectively encrypting portions of media data 310.

The configuration settings for the encryption application 320 identify the portions of the media data 310 that are to be selectively encrypted. Thus, the settings can identify that only portions of headers, frames, or packets are encrypted. Alternatively, the settings can identify that only a certain percentage or only key frames are to be encrypted for the media data 310. The configuration settings are customizable by a content provider 340.

Once an initial portion of the media data is initially encrypted by the encryption application 320, then this frame or packet of the media data 310 that was processed, including the encrypted portion, is passed to the streaming application 330. The streaming application 330 can be any standard streaming application 330 readily available to one of ordinary skill in the art. The streaming application will buffer, if necessary, and interface with one or more standard network applications to begin streaming the media data, including the encrypted portion, over the network 335.

In some embodiments, as was discussed above with FIG. 2, the media data 310 can be preprocessed in advance to have selected portions encrypted. Alternatively, and perhaps in most circumstances, the media data 310 is dynamically and in real time selectively encrypted as it is being streamed over the network 335 by system 300.

The media data 310 is securely sent over the network 335 by the streaming application to a recipient 350. Within the recipient's 350 computing environment, one or more decryption applications 360 decrypt the selectively encrypted portions of the media data 310, where the decrypted portions and unencrypted portions of the media data 310 are retrieved or received by a media player application 370 and played or consumed by the recipient 350.

In some embodiments of the present invention, the media player 370 can be modified to decrypt the selectively encrypted portions of the media data 310. In these embodiments, the decryption applications 370 may be directly called or interfaces to the media player application 370. In other embodiments, the media player application 370 is entirely unaware that the media data 310 has been selectively encrypted since the only media data that it processes is already properly decrypted and available for consumption.

With the embodiments of system 300, media data 310 is securely and efficiently streamed and consumed over a network by selectively encrypting only small portions of the entire media data 310. However, these portions are necessary to effectively play or otherwise consume the media data 310 in its entirety. Thus, a content provider 340 can ensure secure distribution of its content without unduly taxing the computing resources of the content provider 340. Additionally, the recipient 350 can now consume secure content (e.g., media data) more rapidly, since its resources need not decrypt the entire media content 310 data feed.

Figure 4:
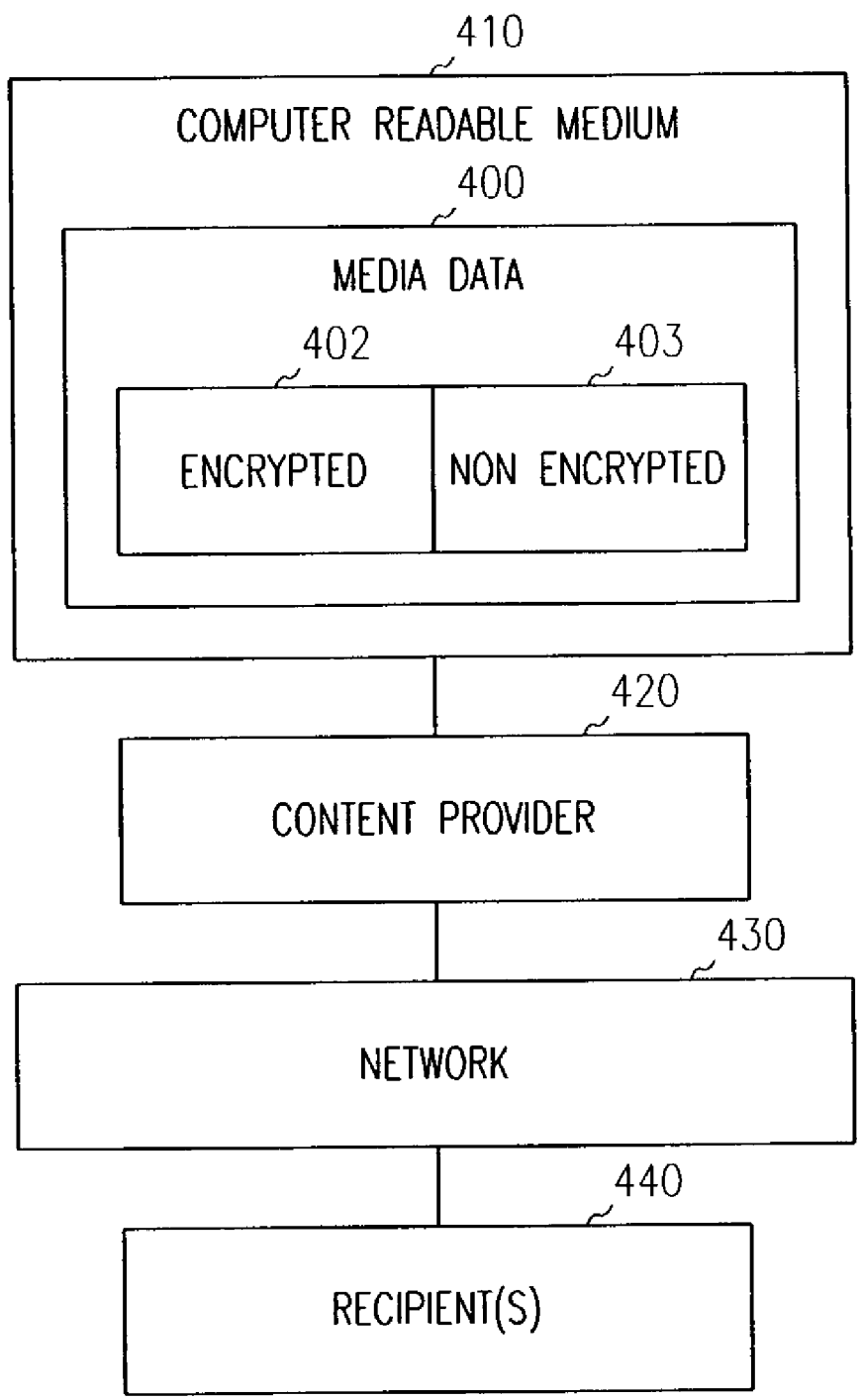
FIG. 4 is a diagram of media data, according to one embodiment of the present invention.

FIG. 4 illustrates a diagram of media data 400, according to one embodiment of the present invention. The media data 400 includes an encrypted portion 402 and an unencrypted portion 403 of data. The media data 400 also includes header information or other metadata that define various aspects about the media data 400. The media data resides and is accessible in one or more computer readable media 410. Moreover, the media data 400 need not be contiguously stored within a computer readable medium, since it is readily apparent to one of ordinary skill in the art that the media data 400 can reside in non-contiguous and different media and then logically assembled for processing and consumption.

The encrypted portion 402 of the media data 400 is presented in FIG. 4 for purposes of illustration and understanding only, since it is not required that the encrypted portion 402 be contiguously stored within the media data 400 in a single location. In fact, the encrypted portion can be non-contiguously dispersed throughout various portions of the media data 400. Moreover, the encrypted portion 402 need not be prefabricated, since the encrypted portion 402 of the media data 400 can be dynamically assembled as the media data is transformed from raw unencrypted media data into media data with a selective encrypted portion 402.

Moreover, the encrypted portion 402 can include header information, frame information, or packet information for the media data 400. Further, not all of the header, frame, and/or packet information need be encrypted, since only a beginning piece of information can be encrypted in some embodiments. Additionally, in some other embodiments, a predefined percentage of the media data 400 is represented as the encrypted portion 402. In still other embodiments, only key frames or selective key frames are encrypted. Any encryption algorithm or technique can be used to produce the encrypted portion 402.

The media data 400 is streamed from a content provider's 420 computing environment over a network 430 to one or more recipients 440. The streamed media data 400 includes the encrypted portion 402 and the unencrypted portion 403. The network 430 can be a wireless network, a hardwired network, an infrared network, a satellite network, a radio frequency network, or a combination of different types of networks interfaced together.

The recipient 440 receives the media data 400, including the encrypted portion 402 and the unencrypted portion 403, and uses one or more decryption keys and decryption applications to decrypt the encrypted portion 402. If the recipient 440 lacks the proper decryption key, then the recipient's media player application will not be able to play/consume any of the media data 400. Thus, the encrypted portion 402 is at least partially present for the initial or first portion of the media data 400 that is received and processed by the recipient 440. In this way, none of the media data is consumable unless the recipient possesses the proper key to at least encrypt the initial feed of media data 400. For improved security, each frame or packet header can include some encrypted portion 402 that must be properly decrypted by the recipient 440 before being consumed. Alternative, as discussed above, various portions dispersed throughout the media data 400 can include encrypted portions 402.

One of ordinary skill in the art now appreciates upon reading and comprehending the present disclosure how media data can be securely streamed and consumed without sacrificing processor and memory efficiencies. This is an improvement over conventional techniques where either the entire media data stream is encrypted or none of the media data stream is encrypted.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives, modifications, equivalents, and variations that fall within the spirit and broad scope of the attached claims.

What is claimed is:

1. A method to selectively encrypt streaming media data, comprising:
    selectively encrypting a portion of media data, wherein the media data includes video and audio data, and wherein an encryption technique being used and the portion of the media data being encrypted are represented as encryption settings that are received from a content provider associated with the media data encrypted, wherein the media data is divided into a configurable number of byte chunks of a configurable size, and wherein the non-contiguous pieces include a configurable number of bytes within each chunk; and
    streaming the portion of media data encrypted and the media data to one or more recipients located over a network, and wherein to use any portion of the media data the one or more recipients have to decrypt the portion that is encrypted.

2. The method of claim 1 wherein in selectively encrypting, the portion includes a predefined percentage of the media data.

3. The method of claim 2 wherein in selectively encrypting, the predefined percentage is configurable.

4. The method of claim 1 wherein in selectively encrypting, the portion includes non-contiguous pieces of data included within the media data.

* * * * *